June 23, 1964 A. KRINITZ ETAL 3,138,716

HIGH-POWER SEMICONDUCTOR-MAGNETIC PULSE GENERATOR

Filed Jan. 12, 1959 2 Sheets-Sheet 1

INVENTORS
ARTHUR KRINITZ
PAUL R. JOHANNESSEN
BY Robert S. Horn, Jr.
ATTORNEY

INVENTORS
ARTHUR KRINITZ
PAUL R. JOHANNESSEN
BY Robert J. Horn, Jr.
ATTORNEY

United States Patent Office 3,138,716
Patented June 23, 1964

3,138,716

HIGH-POWER SEMICONDUCTOR-MAGNETIC PULSE GENERATOR

Arthur Krinitz, Cambridge, and Paul R. Johannessen, Waltham, Mass., assignors to Massachusetts Institute of Technology, Cambridge, Mass., a corporation of Massachusetts Filed Jan. 12, 1959, Ser. No. 786,155
5 Claims. (Cl. 307—88)

This invention relates to a pulse generation system and in particular to high-power modulators which incorporate semiconductor devices and saturable reactors.

Most modulators in current use assume a form which requires either high-power vacuum tube pulse amplifiers or an electronic discharge device in the form of an electrically conducting arc or a hydrogen thyratron. In addition, a discharge device may be constructed by a combination of an electron tube driver and an inductor which has an essentially rectangular hysteresis characteristic. The deficiencies of these types of modulators include unreliability, bulk, weight and jitter. These deficiencies are well known to the art and have resulted in attempts to devise new modulation techniques operating on different physical principles.

A less conventional modulator has been described by W. S. Melville in the Proc. I.E.E. Pt. III, February 1951, pp. 185–207 entitled, "The Use of Saturable Reactors as Discharge Devices for Pulse Generators." The modulators described in the article use inductors with magnetic cores having square-loop hysteresis characteristics. The prime source of energy is an alternating current generator which energizes a cascade of magnetic core inductors and capacitors connected in such manner that pulse compression occurs as the energy progresses down the circuit resulting ultimately in a narrow pulse of high power. The electromechanical alternating current generator severely limits the utility of the modulator because the alternator suffers from the usual disadvantages of rotating machinery. The use of such an alternator results in a modulator which has large time jitter between pulses and a fixed repetition rate system. In addition, some variations of the basic modulator circuitry require the use of a thyratron with its attendant disadvantages.

There exists a need in airborne applications particularly of a modulator whose design either eliminates entirely or drastically mitigates the disadvantages inherent in prior modulator designs. In addition, modern military requirements dictate operational characteristics either unattainable or difficult of attainment with existing modulator designs. For example, it may be desirable to generate high-power pulses where the time interval between pulses can be programmed to produce an optimum according to some criteria. This type of time duration modulation capability is attainable by the method of modulation to be described herein.

The primary object of this invention is to provide a pulse generation system which produces pulses of high peak power by control of a low-voltage low-peak-current switching device operating in conjunction with saturable core reactors.

A second object of this invention is to provide a high-power pulse generation system that uses semiconductor and magnetic devices in order to achieve a system having very high reliability.

Another object of this invention is to provide a method of pulse generation which has the capability of pulse-to-pulse controlled variation of pulse repetition rate.

Another object of this invention is to provide a pulse generation system in which the undesirable pulse-to-pulse time interval variation, commonly called jitter, is minimized.

Another object of this invention is to provide a pulse generation system which requires a minimum of weight and bulk.

These and other objects are accomplished by connecting a constant voltage direct current source to a resonant LC circuit by means of a switch which can assume the form of a controllable semiconductor device having desirable switching characteristics. The switch is closed by an initiating electrical waveform and is opened either automatically or by another electrical waveform at a time when all or most of the energy of the resonant circuit is stored in the capacitor C. The energy stored on capacitor C is transferred to a load in the form of a high-power pulse of short time duration by a cascade of capacitors and magnetic reactors having essentially rectangular hysteresis loops. The design and interconnection of the capacitors and magnetic devices is such that the energy initially stored on capacitor C is compressed in time duration by passage through the magnetic and capacitive elements which terminate in a pulse shaping network and the load.

Other important objects and details of the invention will appear from a reading of the description thereof in conjunction with the drawings forming a part of this application in which.

Figure 1:
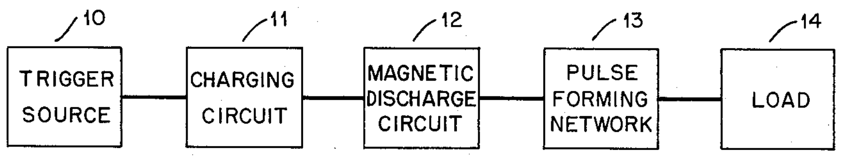
FIGURE 1 is a block diagram schematically illustrating the pulse generator.
Figure 2:
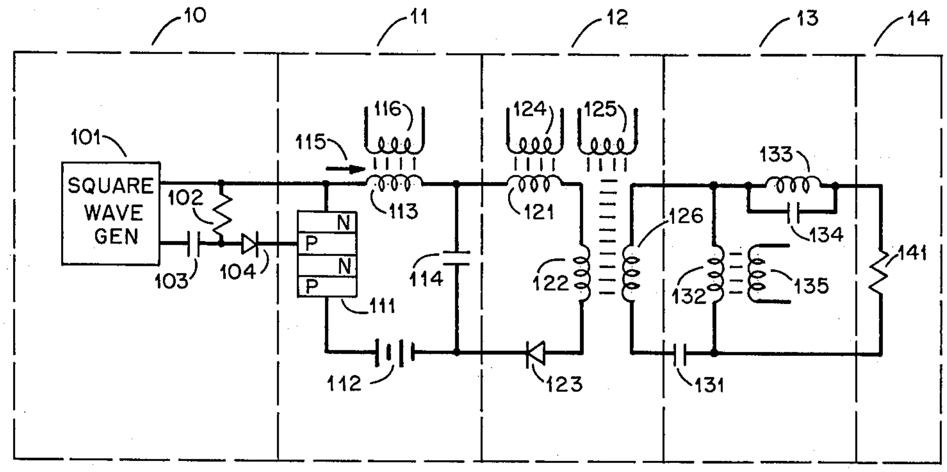
FIGURE 2 is a wiring diagram of the block diagram of FIGURE 1.

Referring to FIGURES 1 and 2, the generation of a pulse is initiated by trigger source 10. The square wave oscillator 101 is adjusted to operate at the frequency of the desired pulse repetition rate. The output of the square wave oscillator 101 is differentiated by the network consisting of resistor 102 and capacitor 103. The differentiated signal is applied to a semiconductor device 111 through a diode 104.

The charging circuit 11 consists of a direct current source 112, saturable reactor 113, capacitor 114 and the semiconductor device 111. The semiconductor device 111 is a p-n-p-n silicon triode, whose characteristics resemble those of a thyratron, and is sometimes referred to as a controlled rectifier. The operation of the charging circuit is initiated by the application of a pulse to the controlled rectifier 111 through diode 104. A pulse of sufficient magnitude will cause the controlled rectifier 111 to conduct with little voltage-drop thereby allowing the voltage source 112 to charge capacitor 114 through the saturable reactor 113 which has an idealized square-loop hysteresis curve such as shown in FIGURE 3.

Figure 3:
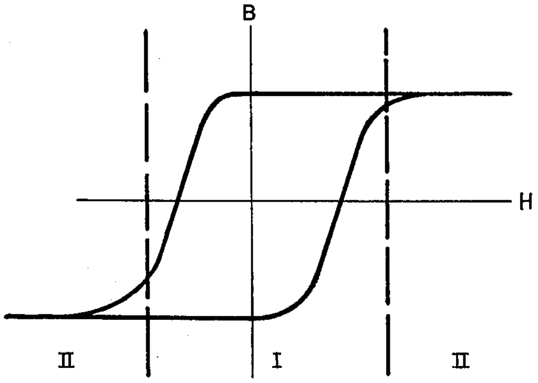
FIGURE 3 shows an approximate hysteresis curve for a suitable magnetic material.

Saturable reactor 113 is biased by a current in its bias winding 116 in such manner that a current in the direction shown by arrow 115 drives the core of 113 further into its saturated region, region II of FIGURE 3, where reactor 113 acts like a linear inductor of relatively small inductance when compared to the inductance in its unsaturated state, region I of FIGURE 3. Reactor 113 and capacitor 114 constitute an isolated resonant circuit when saturable reactor 121 behaves as a relatively high impedance. Since an LC resonant circuit has the property that the voltage across C will be a maximum when the current in L is a minimum, the current in reactor 113 will tend to go in a direction opposite to direction arrow 115 when the voltage on capacitor 114 is at its maximum. When this reversal in current direction 115 occurs, p-n-p-n switch is reverse-biased to non-conduction and the core of reactor 113 is driven into its unsaturated state, region I of FIGURE 3, and hence presents a high impedance. This high impedance limits the magnitude of the reverse current to a small value so that the voltage spike which occurs across the controlled rectifier at current shut-off is very small.

Saturable reactor 121 is biased at negative saturation by winding 124 so that the voltage increase across capacitor 114 drives reactor 121 out of saturation. Consequently, reactor 121 is in its high impedance state, region I of FIGURE 3, during the charging of capacitor 114. With the proper adjustment of its flux-turns product, reactor 121 reaches positive saturation when the voltage on capacitor 114 reaches its maximum value. Now capacitor 114 discharges into capacitor 131 through the relatively low saturated inductance of reactor 121 and through transformer 122. Transformer 122 is biased by winding 126 at negative saturation and its constants are chosen so that the voltage increase across capacitor 114 drives the core of transformer 122 toward positive saturation at a slower rate than reactor 121. Consequently at the time capacitor 114 discharges through reactor 121 at low impedance, transformer 122 is in region I of FIGURE 3 where the flux in its core is changing and voltage is induced in its secondary winding 126 which acts to charge capacitor 131. The charging path for capacitor 131 is through the secondary winding 126 of transformer 122 and the saturated reactor 132. As discussed with respect to reactor 121, with proper adjustment of its flux-turns product, transformer 122 can be made to reach saturation at the time when capacitor 131 reaches its maximum voltage. Reactor 132 is biased by winding 135 just into the region of saturation in such direction that the charging current for capacitor 131 drives the core further into saturation. Transformer 122 may be a voltage step-up transformer in case the load is a magnetron which requires pulse voltages in the order of several kilovolts.

At the time transformer 122 saturates, capacitor 131 starts to discharge through the secondary winding 126, which now has low impedance and through the parallel circuits of reactor 132 and the series combination of load 141 and network 133–134. The discharge current of capacitor 131 passing through inductor 132 drives its core into region I of FIGURE 3 and, therefore, reactor 132 has high impedance during the discharge of capacitor 131. The capacitor 131, saturated inductance of 126, and the parallel combination of inductor 133 and capacitor 134 constitute a two-section Guillemin-type pulse forming network which results in a pulse across load 141 having a desirable rectangular wave shape during the discharge of capacitor 131.

There is a problem associated with the resetting of the core of saturable reactor 121 to a state of negative saturation. Reactor 121 is reset by a constant bias current in winding 124 which produces a linear voltage increase on capacitor 114 in the negative direction. This voltage reaches a definite value when the core reaches negative saturation at the end of the resetting interval. For maximum pulse repetition rate, the controlled rectifier 111 is made conducting by a trigger pulse from trigger source 10 at this time and this charge stored on capacitor 114 discharges through the controlled rectifier 111, reactor 113, and back on 114 in the desirable positive direction to add to voltage from voltage source 112.

However, if the circuit is operated below the maximum pulse repetition rate, which is determined by the resonant frequency of reactor 113 and capacitor 114, the controlled rectifier 111 is non-conducting when saturable reactor 121 reaches negative saturation and capacitor 114 would discharge through the magnetic discharge network 12 in the negative direction. Diode 123 holds the charge stored in capacitor 114 during the resetting interval and until the semiconductor device 111 is turned on. We find that circuit operation is less critical and that satisfactory operation is obtained over a wider range of pulse repetition frequencies when diode 123 is used as shown in FIGURE 2. Since operation over a wide range of pulse repetition frequencies is possible, it is seen that the triggering pulses applied to semiconductor device 111 may be made non-uniform in time-interval spacing in a predetermined manner limited primarily by the maximum pulse repetition rate.

Since the voltage to which capacitor 114 charges is dependent on the voltage of the direct voltage source 112, it is evident that variations in the voltage of the source 112, for instance a ripple voltage, will result in fluctuations in the voltage to which capacitor 114 charges. Since the saturable magnetic devices 121, 122 and 132 subsequent to capacitor 114 are designed to saturate at a predetermined value of the integral of time and their respective impressed time-varying voltages, it is evident that variations in voltage will result in saturation occurring at different times. Therefore, if jitter is to be minimized, the direct voltage source must have minimum ripple.

Figure 4:
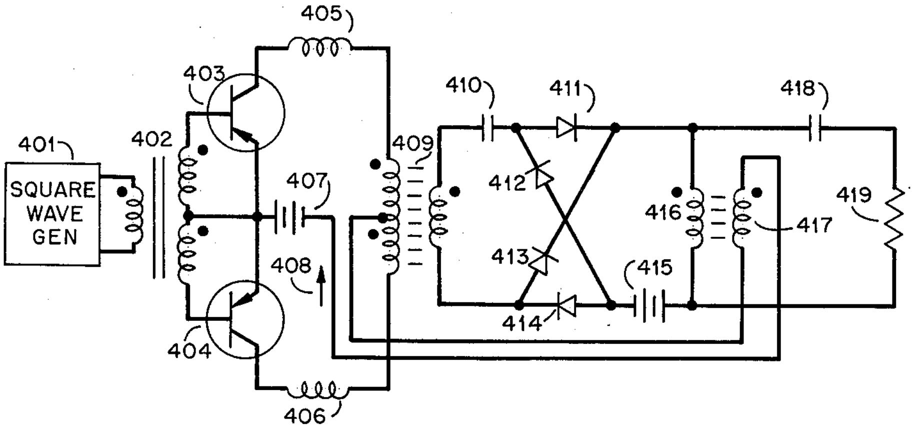
FIGURE 4 is a block diagram of an alternate configuration of the pulse generator wherein transistors in a push-pull configuration are employed.

If the power output of the modulator is being limited by the capacity of the switching element 111, it is evident that paralleling of switching elements is a simple matter in the circuit illustrated by FIGURE 2. An alternate way of increasing the average power level of the modulator output is to use switching elements in a push-pull arrangement. An illustration of this type of circuit is shown in FIGURE 4. Note that transistors rather than the p-n-p-n controlled rectifier of FIGURE 2 are used as switching elements. The operation of the push-pull circuit of FIGURE 4 is basically the same as described for the single-ended drive of FIGURE 2; however, some fundamental aspects of push-pull operation are utilized in the magnetic circuitry to eliminate the necessity for bias windings on some cores.

The operation of the push-pull circuit of FIGURE 4, except for the biasing of saturable transformer 409, is essentially the same as the operation of the circuit of FIGURE 2. The square-wave generator 401 is coupled to transistors 403 and 404 through transformer 402 in such manner that transistor 403 is conducting heavily when transistor 404 is cut-off and vice versa. Assume that at time $t=0$, saturable transformer 409 is in a state of saturation which will arbitrarily be designated as a negative state of saturation. At the same time, transistor 403 is turned on and transistor 404 is turned off. Capacitor 410 is coupled in series with inductor 405 by means of transformer 409. As the current through the resonant LC circuit consisting of inductor 405 and capacitor 410 increases, the flux in transformer 409 is driven from negative to positive saturation and capacitor 410 is charged through diodes 411 and 414, reactor 416 and bias voltage 415. At time $t=T$, where T is one-half the period of the resonant circuit composed of inductor 405 and capacitor 410 reflected to the primary of transformer 409, the current in inductor 405 is zero, the voltage on capacitor 410 is a maximum and transformer 409 just reaches positive saturation. Capacitor 410 then discharges through the saturated inductance of the secondary of transformer 409, diodes 412 and 413 and capacitor 418. Reactor 416 is unsaturated during the time that capacitor 418 is being resonantly charged. At the time capacitor 418 reaches its peak value, reactor 416 saturates and capacitor 418 then discharges into the load 419. Reactor 416 is reset by the same current which flows in transformer 409 when capacitor 410 is being charged. During the resetting interval of reactor 416, the current in the bias winding 417 of reactor 416, referred to the main winding of reactor 416 is slightly larger than the current which actually flows in the main winding because of the charging of capacitor 410. This small excess current flows through capacitor 418 and load 419 and develops the resetting voltage for reactor 416.

The battery 415 assures that the diodes, 411, 412, 413 and 414, do not short circuit the resetting voltage of reactor 416. The battery 415 unavoidably absorbs power during the charging interval of capacitor 410. If the time available for resetting reactor 416 is long, then the voltage generated in the main winding of reactor 416 will be small and battery 415 can be correspondingly decreased in voltage magnitude thereby making the power absorbed by battery 415 negligible.

At time $t=T$, there also occurs a reversal in the conduction stages of transistors 403 and 404. Transistor 404 is made conducting and transistor 403 is made non-conducting. The battery 407 then causes a current to flow in the direction of arrow 408 through reactor 406 which in turn causes the flux in transformer 409 to change from positive to negative saturation and capacitor 410 to acquire a charge through a flow of current in diodes 412 and 413, reactor 416 and bias source 415. Capacitor 410 then discharges into capacitor 418 through diodes 411 and 414, and the saturated inductance of the secondary of transformer 409. The remainder of the circuit operates in the same manner as on the previous charging cycle. Thus, uni-directional pulses are obtained across load 419 at a repetition rate equal to twice the basic frequency of the square-wave generator 401.

The detailed circuit description of FIGURES 2 and 4 illustrate the technique by which saturable reactors operate as high-power switching devices and together with capacitors reduce the duration of the current pulse from a long duration at the charging circuit to a short duration at the output.

Small size and reliable operation are achieved through the use of semiconductor switching devices and saturable magnetic cores rather than thyratrons or vacuum tubes. Therefore, it is apparent that we have disclosed that a magnetic pulse generator which uses a semiconductor switch in a charging circuit is capable of generating high-power pulses and is useful as a radar modulator.

Having thus described the invention, what is claimed is:

1. A circuit for generating high-power pulses of electrical energy comprising, a source of direct current energy, a first resonant circuit comprising a serial connection of an inductor and a capacitor, a source of trigger pulses, a p-n-p-n semiconductor controlled rectifier connected between said direct current energy source and said resonant circuit, said p-n-p-n rectifier having its control terminal biased by said trigger pulses to become conducting and initiate current flow into said resonant circuit from said direct current energy source and being responsive to current reversal in said resonant circuit to become non-conducting, a storage capacitor, a saturable reactor resonant circuit coupling said storage capacitor to the capacitor of said first resonant circuit, a wave shaping network and a load serially connected to said storage capacitor through said wave shaping network whereby the energy stored in the capacitor of said first resonant circuit is transferred to said load through said saturable reactor circuit and said storage capacitor as a high-power short time duration pulse.

2. A circuit for generating high-power pulses of electrical energy comprising, a constant voltage source of direct current energy, a first series resonant circuit comprising an inductor and capacitor, a source of control voltage pulses, a semiconductor switching means serially connected between said direct current source and said resonant circuit, said switching means becoming conductive in response to said control voltage pulses to initiate current flow into said first resonant circuit from said voltage source and becoming nonconductive on current reversal in said first resonant circuit, a load, a saturable reactor circuit connecting said load to the capacitor of said first resonant circuit.

3. A circuit for generating high power pulses of electrical energy comprising, a source of direct current energy, a first resonant circuit including a capacitor and a saturable reactor, said reactor having a core of square hysteresis loop material, a source of accurately timed repetitive waveform, a semi-conductor switch responsive to said waveform source to initiate current flow from said direct current source through said reactor into said capacitor, the time interval of current flow being determined by the current reversal at the half-period of said resonant circuit, a second resonant circuit, a first saturable magnetic switching circuit for transferring energy from said capacitor to said second resonant circuit, a pulse shaping network, a load, and a second saturable magnetic switching circuit for transferring energy from said second resonant circuit through said pulse shaping network to said load.

4. A circuit for generating high power of electrical energy comprising, a source of direct current energy, a first resonant circuit comprising a capacitor and a saturable inductor, said inductor having a core of square hysteresis loop material, a source of trigger voltage pulses, a semiconductor controlled rectifier responsive to said trigger voltage pulses to initiate current flow from said direct current source into said capacitor through said rectifier and said inductor to charge said capacitor, said inductor having a bias means biasing said inductor into saturation, said inductor being in a saturated state during said charging of the capacitor, said rectifier ceasing to conduct upon reversal of current flow in said resonant circuit, said reversal of current causing said inductor to become unsaturated to present a high impedance to said current flow, a magnetic discharge circuit, a load, said discharge circuit connecting said capacitor to said load, whereby said capacitor discharges its energy into said load in the form of a pulse.

5. A circuit for generating high power pulses of electrical energy of the type wherein the energy stored in a storage capacitor is discharged into a load through a cascade of saturable reactor switching circuits comprising, a source of direct current energy, a saturable reactor having a square hysteresis loop material connected to said capacitor to form a series resonant circuit, a biasing means to cause said reactor to be in a saturated state, a source of trigger voltage pulses, a p-n-p-n semiconductor controlled rectifier biased by said trigger voltage pulses to initiate current flow from said direct current source charging said capacitor through said reactor and said rectifier, said inductor being biased by said current to a state of saturation during the charging of said condenser, current reversal in said resonant circuit acting to cause said saturable reactor to shift to an unsaturated state presenting high impedance to current flow and said rectifier to become nonconducting whereby said direct current source is isolated from said storage capacitor at the half-period of said resonant circuit when said saturable reactor switching circuits discharge said storage capacitor.

References Cited in the file of this patent

UNITED STATES PATENTS

| | | |
|---|---|---|
| 2,773,184 | Rolf | Dec. 4, 1956 |
| 2,808,511 | Thulin | Oct. 1, 1957 |
| 2,824,976 | Weinberg et al. | Feb. 25, 1958 |
| 2,835,811 | Bruyning | May 20, 1958 |
| 2,923,856 | Green et al. | Feb. 2, 1960 |
| 3,015,739 | Manteuffel | Jan. 2, 1962 |

OTHER REFERENCES

Publication: Melville Proc. I.E.E., Pt. III, February 1951, pp. 185–207, "The Use of Saturable Reactors as Discharge Devices."

Publication: MacKintosh, Proceedings of the I.R.E., June 1958, pp. 1229 to 1235.